United States Patent
Riley et al.

(10) Patent No.: US 9,354,321 B2
(45) Date of Patent: May 31, 2016

(54) METHOD FOR POSITION DETERMINATION WITH MEASUREMENT STITCHING

(75) Inventors: Wyatt Thomas Riley, King of Prussia, PA (US); John R. Blackmer, Oakland, CA (US); Dominic Gerard Farmer, Los Gatos, CA (US); Rayman Wai Pon, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 11/682,830

(22) Filed: Mar. 6, 2007

(65) Prior Publication Data

US 2007/0205941 A1 Sep. 6, 2007

Related U.S. Application Data (60) Provisional application No. 60/779,935, filed on Mar. 6, 2006.

(51) Int. Cl.
*G01S 19/35* (2010.01)
*G01S 19/42* (2010.01)
*G01S 19/25* (2010.01)

(52) U.S. Cl.
CPC .............. *G01S 19/35* (2013.01); *G01S 19/25* (2013.01); *G01S 19/42* (2013.01)

(58) Field of Classification Search
CPC ..................................................... G01S 19/42
USPC ............................ 342/357.25; 701/479, 480
See application file for complete search history.

(56) References Cited

U.S. PATENT DOCUMENTS

| | | | | |
|---|---|---|---|---|
| 5,452,211 A | * | 9/1995 | Kyrtsos et al. | 701/470 |
| 5,663,734 A | | 9/1997 | Krasner | |
| 5,774,829 A | * | 6/1998 | Cisneros et al. | 701/213 |
| 5,862,511 A | | 1/1999 | Croyle et al. | |
| 5,874,914 A | * | 2/1999 | Krasner | 342/357.29 |
| 5,883,594 A | | 3/1999 | Lau | |
| 5,884,220 A | | 3/1999 | Farmer et al. | |
| 5,983,159 A | * | 11/1999 | Schipper | 701/478 |
| 5,999,124 A | * | 12/1999 | Sheynblat | 342/357.09 |
| 6,016,119 A | | 1/2000 | Krasner | |

(Continued)

FOREIGN PATENT DOCUMENTS

| | | |
|---|---|---|
| CN | 1152356 A | 6/1997 |
| CN | 1425226 A | 6/2003 |

(Continued)

OTHER PUBLICATIONS

Mao et al, (Non-Linear GPS Models for Position Estimate Using Low-cost GPS Receiver). Intelligent Transportation Systems, 2003. Proceedings. 2003 IEEE (vol. 1), Oct. 2003, pp. 637-642.*

(Continued)

*Primary Examiner* — Gregory C Issing
(74) *Attorney, Agent, or Firm* — Andrea Mays; Thomas A. Jolly (57) ABSTRACT

A mobile communications device uses a method for determining position that involves a positioning filter, such as a Kalman filter, which is initialized with measurements from reference stations such as satellite vehicles and/or base stations which may be acquired during different epochs. Accordingly, the positioning filter may be used for position estimation without the need to first acquire at least three different signals during the same measurement epoch.

30 Claims, 9 Drawing Sheets

(56) References Cited

U.S. PATENT DOCUMENTS

| | | |
|---|---|---|
| 6,055,477 A | 4/2000 | McBurney et al. |
| 6,104,340 A | 8/2000 | Krasner |
| 6,246,960 B1 | 6/2001 | Lin |
| 6,252,543 B1* | 6/2001 | Camp .................. 342/357.06 |
| 6,259,398 B1 | 7/2001 | Riley |
| 6,285,316 B1* | 9/2001 | Nir et al. ................ 342/357.09 |
| 6,295,024 B1 | 9/2001 | King et al. |
| 6,424,914 B1 | 7/2002 | Lin |
| 6,429,809 B1 | 8/2002 | Vayanos et al. |
| 6,433,739 B1 | 8/2002 | Soliman |
| 6,490,456 B1 | 12/2002 | Bogdan et al. |
| 6,493,631 B1 | 12/2002 | Burns |
| 6,535,833 B1* | 3/2003 | Syrjarinne .................. 702/150 |
| 6,570,530 B2 | 5/2003 | Gaal et al. |
| 6,587,692 B1* | 7/2003 | Chen et al. ............... 455/456.1 |
| 6,664,923 B1* | 12/2003 | Ford ........................ 342/357.59 |
| 6,735,523 B1 | 5/2004 | Lin et al. |
| 6,975,266 B2* | 12/2005 | Abraham et al. ........ 342/357.02 |
| 7,409,289 B2 | 8/2008 | Coatantiec et al. |
| 7,586,441 B2 | 9/2009 | Huang et al. |
| 7,613,917 B1 | 11/2009 | Chojnacki |
| 7,623,871 B2 | 11/2009 | Sheynblat |
| 7,646,330 B2 | 1/2010 | Karr |
| 7,987,049 B2 | 7/2011 | Hayashi et al. |
| 8,614,641 B2 | 12/2013 | Yule et al. |
| 2001/0020216 A1 | 9/2001 | Lin |
| 2002/0015439 A1 | 2/2002 | Kohli et al. |
| 2002/0032525 A1 | 3/2002 | Yoshikawa et al. |
| 2002/0047799 A1 | 4/2002 | Gustafson et al. |
| 2002/0089450 A1 | 7/2002 | Dowdle et al. |
| 2002/0126044 A1 | 9/2002 | Gustafson et al. |
| 2003/0132878 A1 | 7/2003 | Devereux et al. |
| 2003/0146869 A1 | 8/2003 | Lin et al. |
| 2003/0149528 A1 | 8/2003 | Lin |
| 2004/0002344 A1 | 1/2004 | Moeglein et al. |
| 2004/0025277 A1 | 2/2004 | Chen |
| 2004/0145519 A1* | 7/2004 | Cho ........................ 342/357.06 |
| 2004/0257277 A1* | 12/2004 | Abraham et al. ........ 342/357.09 |
| 2005/0090266 A1 | 4/2005 | Sheynblat |
| 2005/0162312 A1 | 7/2005 | Riday |
| 2005/0192745 A1 | 9/2005 | Abraham et al. |
| 2005/0203701 A1 | 9/2005 | Scherzinger |
| 2005/0228589 A1* | 10/2005 | Diggelen et al. ................... 702/1 |
| 2005/0288033 A1 | 12/2005 | McNew et al. |
| 2006/0028377 A1* | 2/2006 | Abraham .................. 342/357.12 |
| 2006/0071851 A1 | 4/2006 | Graas et al. |
| 2006/0293853 A1 | 12/2006 | Chiou et al. |
| 2007/0004430 A1 | 1/2007 | Hyun et al. |
| 2007/0016371 A1 | 1/2007 | Waid et al. |
| 2008/0032706 A1 | 2/2008 | Sheynblat et al. |
| 2008/0071469 A1 | 3/2008 | Caveney |
| 2008/0088507 A1 | 4/2008 | Smith et al. |
| 2008/0091350 A1 | 4/2008 | Smith et al. |
| 2008/0117100 A1 | 5/2008 | Wang et al. |
| 2008/0262728 A1 | 10/2008 | Lokshin et al. |
| 2008/0270026 A1 | 10/2008 | Han |
| 2008/0279421 A1 | 11/2008 | Hamza et al. |
| 2008/0284643 A1 | 11/2008 | Scherzinger et al. |
| 2009/0093959 A1 | 4/2009 | Scherzinger et al. |
| 2009/0287414 A1 | 11/2009 | Vickery |
| 2009/0315772 A1 | 12/2009 | Wengler et al. |
| 2009/0322598 A1 | 12/2009 | Fly et al. |
| 2010/0117894 A1 | 5/2010 | Velde et al. |
| 2010/0117897 A1 | 5/2010 | Riley et al. |
| 2010/0194634 A1 | 8/2010 | Biacs et al. |
| 2010/0312461 A1 | 12/2010 | Haynie et al. |
| 2010/0318292 A1 | 12/2010 | Kulik et al. |
| 2011/0148697 A1 | 6/2011 | Thiel et al. |
| 2011/0163913 A1 | 7/2011 | Cohen et al. |
| 2011/0298658 A1 | 12/2011 | Riley et al. |
| 2012/0032842 A1 | 2/2012 | Smith et al. |
| 2012/0146847 A1 | 6/2012 | Janky et al. |
| 2013/0344901 A1 | 12/2013 | Garin et al. |
| 2014/0080514 A1 | 3/2014 | Das et al. |
| 2014/0225770 A1 | 8/2014 | Riley et al. |

FOREIGN PATENT DOCUMENTS

| | | |
|---|---|---|
| CN | 1893728 A | 1/2007 |
| EP | 1203966 A2 | 5/2002 |
| EP | 1455198 A2 | 9/2004 |
| EP | 1841256 A1 | 10/2007 |
| JP | 1298820 A | 12/1989 |
| JP | 10505723 | 6/1998 |
| JP | 2000028699 A | 1/2000 |
| JP | 2000184430 A | 6/2000 |
| JP | 2001083227 A | 3/2001 |
| JP | 2001177469 A | 6/2001 |
| JP | 2001508250 A | 6/2001 |
| JP | 2001305210 | 10/2001 |
| JP | 2003506690 A | 2/2003 |
| JP | 2004519887 A | 7/2004 |
| JP | 2005517340 A | 6/2005 |
| JP | 2005326225 A | 11/2005 |
| JP | 2006504110 | 2/2006 |
| JP | 2008506126 A | 2/2008 |
| JP | 2011128156 A | 6/2011 |
| KR | 20000007288 | 2/2000 |
| KR | 20070021872 A | 2/2007 |
| KR | 20090040901 A | 4/2009 |
| RU | 2182341 | 5/2002 |
| RU | 2235341 | 8/2004 |
| RU | 2253127 | 5/2005 |
| TW | 448304 B | 8/2001 |
| TW | 200819774 A | 5/2008 |
| WO | WO9635958 A1 | 11/1996 |
| WO | 9718485 A1 | 5/1997 |
| WO | WO9815150 A1 | 4/1998 |
| WO | 9954752 | 10/1999 |
| WO | 0058748 A1 | 10/2000 |
| WO | WO02052225 | 7/2002 |
| WO | 02061450 | 8/2002 |
| WO | 02071095 | 9/2002 |
| WO | WO2004113948 | 12/2004 |
| WO | WO2005004528 A1 | 1/2005 |
| WO | 2006005193 A1 | 1/2006 |
| WO | WO-2006029277 A1 | 3/2006 |

OTHER PUBLICATIONS

European Search Report—EP11001325—Search Authority—Munich—May 6, 2011.
International Search Report—PCT/US07/063428, International Search Authority—European Patent Office—Apr. 29, 2008.
Schmid et al., "Combined Galileo/GPS Architecture for Enhanced Sensitivity Recpetion," ww.sciencedirect.com, International Journal Electronic Communication, 2005, pp. 297-306.
Written Opinion—PCT/US07/063428, International Search Authority—European Patent Office—Apr. 29, 2008.
U.S. Appl. No. 12/425,309. "Method for Position Determination with Measurement Stitching". Wyatt Thomas Riley et al. filed Apr. 16, 2009, QUALCOMM, Incorporated.
Buck T M, et al., "A High G, MEMS Based, Deeply Integrated, INS/GPS, Guidance, Navigation and Control Flight Management Unit" Position, Location, and Navigation Symposium, 2006 IEEE/ION C0r0nad0, CA Apr. 25-27, 2006, Piscataway, NJ, USA,IEEE LNKDDOI: 10.1109/PLANS.2006.1650674, Apr. 25, 2006, pp. 772-794, XP010925000 ISBN: 978-0-7803-9454-4.
Lee H-W, et al., "Self-regulated GPS navigation processor" Signal Processing Systems, 1998. SIPS 98. 1998 IEEE Workshop on Cambridge, MA, USA Oct. 8-10, 1998, New York, NY, USA,IEEE, US LNKD- DOI:10.1109/SIPS.1998.715795, Oct. 8, 1998, pp. 327-336, XP010303693 ISBN: 978-0-7803-4997-1.
Montenbruck O, et al., "Reduced dynamic orbit determination using GPS code and carrier measurements" Aerospace Science and Technology, Elsevier Masson, FR LNKDD01: 10.1016/J.AST.2005.01. 003, vol. 9, No. 3, Apr. 1, 2005, pp. 261-271, XP025368000 ISSN: 1270-9638 [retrieved on Apr. 1, 2005] Sections 2.5, 2.6 figure 2.
Willms B: "Space integrated GPS/INS (SIGI) navigation system for space shuttle" Digital Avionics Systems Conference, 1999. Proceedings. 18th St Louis, M0, USA Oct. 24-29, 1999, Piscataway, NJ, USA,IEEE, US, vol. B.5/12 pp. vol. 2, Oct. 24, 1999, pp. 4-1, XP010366370 ISBN: 978-0-7803-5749-5.

* cited by examiner

METHOD FOR POSITION DETERMINATION WITH MEASUREMENT STITCHING

CROSS-REFERENCE TO RELATED APPLICATIONS

This application claims priority to U.S. provisional patent application Ser. No. 60/779,935 entitled, "Measurement Stitching for Improved Position Location in Wireless Communication System," filed on Mar. 6, 2006, which is assigned to the assignee hereof, and which is incorporated herein by reference.

FIELD

This disclosure relates to positioning systems and, more particularly, to the computation of position solutions for mobile receivers.

BACKGROUND

The Global Positioning System (GPS) is a satellite navigation system, or satellite positioning system, designed to provide position, velocity and time information almost anywhere in the world. GPS was developed by the Unites States Department of Defense, and currently includes a constellation of twenty-four operational satellites. Other types of satellite navigation systems include the Wide Area Augmentation System (WAAS), the Global Navigation Satellite System (GLONASS) deployed by the Russian Federation, and the Galileo system planned by the European Union. As used herein, "satellite positioning system"(SPS) will be understood to refer to GPS, Galileo, GLONASS, NAVSTAR, GNSS, a system that uses satellites from a combination of these systems, pseudolite systems, or any SPS developed in the future.

A variety of receivers have been designed to decode the signals transmitted from the satellites to determine position, velocity or time. In general, to decipher the signals and compute a final position, the receiver must acquire signals from the satellites in view, measure and track the received signals, and recover navigational data from the signals. By accurately measuring the distance from three different satellites, the receiver triangulates its position, i.e., solves for a latitude, longitude and altitude. In particular, the receiver measures distance by measuring the time required for each signal to travel from the respective satellite to the receiver. This requires precise time information. For this reason, measurements from a fourth satellite are typically required to help resolve common time common measurement errors, e.g., errors created by the inaccuracies of timing circuits within the receiver.

In certain locations, e.g., urban environments with tall buildings, the receiver may only be able to acquire signals from three or less satellites. In these situations, the receiver will be unable to resolve all four variables of the position solution: latitude, longitude, altitude, and time. If the receiver is able to acquire signals from three satellites, for example, the receiver may forego an altitude calculation to resolve latitude, longitude and time. Alternately, if altitude is obtained via external means, all four variables may be resolved from three satellite signals. If less than three signals are available, the receiver may be unable to calculate its position.

To address this limitation, many receivers employ hybrid location technology that makes use of signals from base stations of a wireless communication system. As with satellite signals, the hybrid receivers measure time delays of the wireless signals to measure distances from the base stations of the network. The hybrid receivers utilize the signals from the base stations, as well as any acquired signals from GPS satellites, to resolve the position and time variables. The hybrid location technique often allows a receiver to compute a position solution in a wide variety of locations where conventional positioning techniques would fail. In code division multiple access (CDMA) mobile wireless systems, for example, this base station measurement portion of this hybrid technique is referred to as Advanced Forward Link Trilateration (AFLT).

The accuracy of the location solution determined by the receiver is affected by the degree of time precision within the system. In synchronized systems, such as existing CDMA systems, the timing information communicated by the cellular base stations is synchronized with the timing information from the GPS satellites, allowing precise time to be available throughout the system. In some systems, such as the Global System for Mobile Communications (GSM), the timing information is not synchronized between the base stations and the GPS satellites. In these systems, Location Measurement Units (LMUs) are added to the existing infrastructure to provide precise timing information for the wireless network.

Another technique that is commonly used in position determining systems and algorithms is the use of Kalman filters. As is well known, a Kalman filter (KF) is an optimal recursive data estimation algorithm. It is frequently used to model attributes of moving entities such as aircraft, people, vehicles etc. These attributes can include both velocity and position, for example. The current state of the system and a current measurement are used to estimate a new state of the system. In practice, a Kalman filter combines all available measurement data, plus prior knowledge about the system, measuring devices, and error statistics to produce an estimate of the desired variables in such a manner that the error is minimized statistically.

In the past, a Kalman filter used within a mobile telecommunications device typically required certain initialization parameters from an accompanying position system receiver. For example, when a GPS receiver was used, it was typical that simultaneous measurements from at least three different satellite vehicles were obtained before the Kalman filter could be initialized. This means that in one measurement epoch, signals from at least three different satellite vehicles are received and successfully processed by the mobile communications device. This requirement degrades performance of the mobile device because it may take on the order of tens of seconds to acquire signals from three satellite vehicles, especially in urban environments. If the necessary signals are not acquired or are not acquired in a timely manner, then the position determining portion of the mobile device may fail to initialize and may not operate properly or efficiently.

Thus, the typical initialization of a Kalman filter used for position determination of a mobile unit requires that the complete initial state at some time $t_0$ be obtained first before updated position state information can be estimated for times $t > t_0$. This restriction implies that for mobile GPS receivers in marginal signal environments, for example, with time varying obstructions to the line of sight to the satellites, it may difficult or time consuming to acquire simultaneous (i.e., within the same epoch) range measurements from at least 3 GPS satellites needed for Kalman filter initialization. It is highly desirable to improve position determination performance for mobile GPS receivers in harsh signal environments where simultaneity of range measurements may not occur in a timely fashion.

Accordingly, a need remains to improve the position determining capabilities of mobile communications devices and to do so in a timely and efficient way.

SUMMARY

One aspect of the present invention relates to a method for estimating the position of a mobile communications device, comprising: seeding a positioning filter with an approximate position; updating the positioning filter with a first measurement set acquired during a first measurement epoch from a first subset of reference stations, wherein said first subset includes less than three different reference stations; updating the positioning filter with a second measurement set acquired during a second measurement epoch from a second subset of reference stations; and determining a position estimate for the mobile communications device based on the updated positioning filter.

Another aspect of the present invention relates to a method for estimating the position of a mobile communications device, comprising: seeding a positioning filter with an approximate position; updating the positioning filter with a first measurement set acquired during a first measurement epoch from a first subset of pseudoranging sources, wherein the first subset includes less than three different pseudoranging sources; updating the positioning filter with a second measurement set acquired during a second measurement epoch from a second subset of pseudoranging sources; and determining a position estimate for the mobile communications device based on the updated positioning filter.

Another aspect of the present invention relates to a method for estimating the position of a mobile communications device, comprising: storing a set of pseudoranging measurements from a set of reference stations, timestamped with the local clock time; later establishing a relationship between local clock time and satellite vehicle system time; determining the satellite vehicle system time of the stored pseudoranging measurement set; and using the store pseudoranging measurement set, and the satellite vehicle system time of that measurement set to determine the position of the mobile device.

Another aspect of the present invention relates to a method for estimating the position of a mobile communications device, comprising: storing a set of pseudoranging measurements from a set of reference stations; later determining the ephemeris information for the reference stations; and using the stored pseudoranging measurement set, and the newly determined ephemeris information to determine the position of the mobile device.

Another aspect of the present invention relates to a method for estimating the position of a mobile communications device which includes the steps of seeding a positioning filter with an approximate position, updating the positioning filter with a first pseudoranging measurement acquired during a first measurement epoch from a first subset of reference stations, wherein said first subset includes less than three different reference stations; updating the positioning filter with a second pseudoranging measurement acquired during a second measurement epoch from a second subset of reference stations; determining a position estimate for the mobile communications device based on the updated positioning filter; and using back propagation, determine time for the first subset and the second subset.

Yet another aspect of the present invention relates to a mobile communications device comprising a first receiver configured to receive signals related to a satellite positioning system; a second receiver configured to receive signals related to a communications network; a processor in communications with the first and second receiver, the processor configured to: a) seed a positioning filter with a first pseudoranging measurement acquired during a first measurement epoch from a first subset of reference stations of the satellite positioning system, wherein said first subset includes less than three different reference stations; b) update the positioning filter with a second pseudoranging measurement acquired during a second measurement epoch from a second subset of reference stations of the satellite positioning system; and c) determine a position estimate for the mobile communications device based on the updated positioning filter.

It is understood that other embodiments will become readily apparent to those skilled in the art from the following detailed description, wherein it is shown and described various embodiments by way of illustration. The drawings and detailed description are to be regarded as illustrative in nature and not as restrictive.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention. In addition, for the purposes of this disclosure, the term "coupled" means "connected to" and such connection can either be direct or, where appropriate in the context, can be indirect, e.g., through intervening or intermediary devices or other means.

Figure 1:
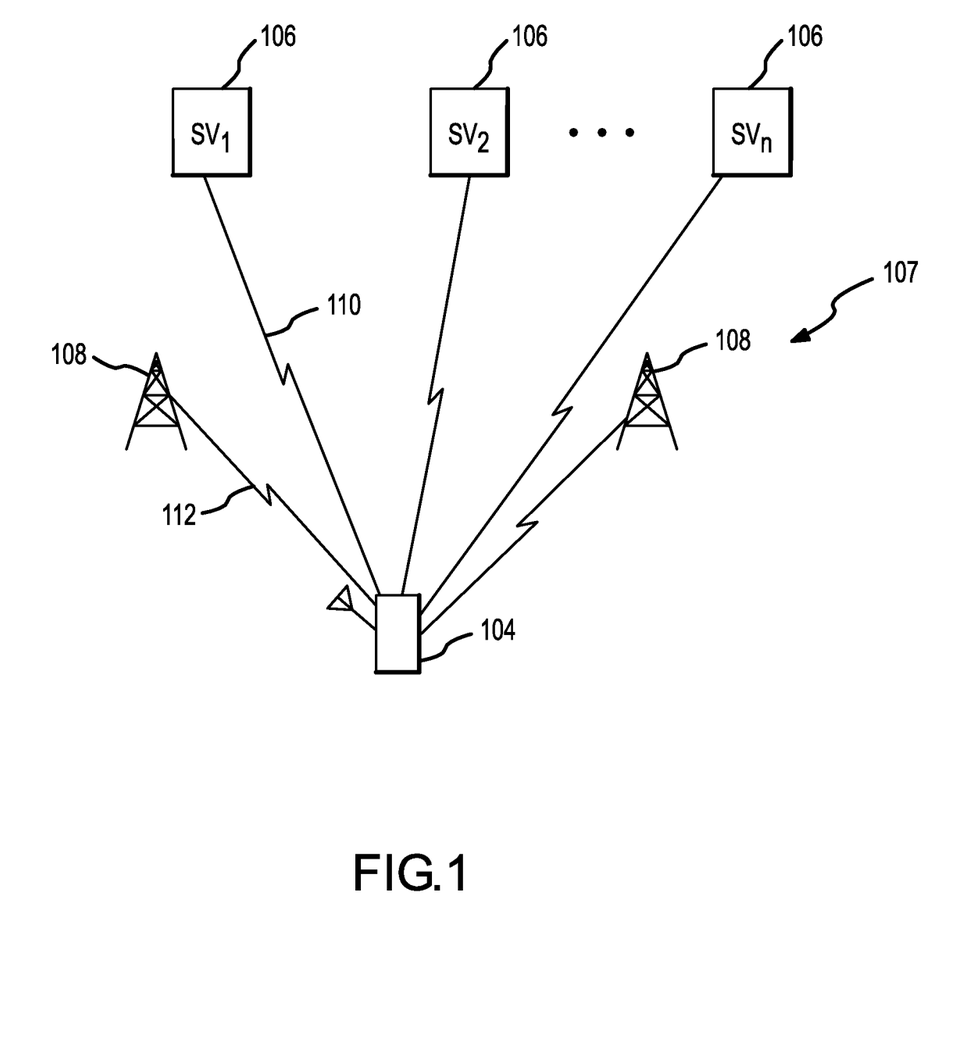
FIG. 1 illustrates a general conceptual view of a mobile device that communicates with a cellular telephone network and a satellite-based positioning system.

As depicted in FIG. 1, mobile unit 104 may take the form of any one of a variety of mobile receivers capable of receiving navigation signals (e.g., satellite navigation signals 110 or wireless communication signals 112) from reference stations such as satellite vehicles 106 and/or from base stations 108, for computing a position solution. Examples include a mobile phone, a handheld navigation receiver, a receiver mounted within a vehicle, such as an airplane, automobile, truck, tank, ship, and the like. Base stations 108 may communicate with mobile unit 104 in accordance with any one of a number of wireless communication protocols in a synchronous environment. One common wireless communication protocol is code division multiple access (CDMA) in which multiple communications are simultaneously conducted over a radio-frequency (RF) spectrum. In a CDMA environment, the techniques may be viewed as a mechanism for enhanced Advanced Forward Link Trilateration (AFLT). Other examples include Global System for Mobile Communications (GSM), which uses narrowband time-division multiple access (TDMA) for communicating data, and General Packet Radio Service (GPRS). In some embodiments, mobile unit 104 may integrate both a GPS receiver and a wireless communication device for voice or data communication. Thus, although the specific example of a GPS system may be described within this document, the principles and techniques of the present invention are applicable to any satellite positioning system or terrestrial positioning system such as a wireless network.

Mobile unit 104 employs techniques to compute a positioning solution based on signals 110, 112 received from satellites 106 and base stations 108, respectively. Mobile unit 104 acquires signals 110 from satellites 106 in view, and measures distance from each satellite by measuring the time required for each signal to travel from the respective satellite to mobile unit 104 to determine the pseudoranging measurement. Similarly, mobile unit 104 may also receive signals 112 from base stations 108 of wireless communication system 107, and measures distances from base stations 108 based on the time required for each wireless signal to travel from the base stations to the mobile unit. Mobile unit 104 typically resolves position and time variables based on the measurements.

Figure 2:
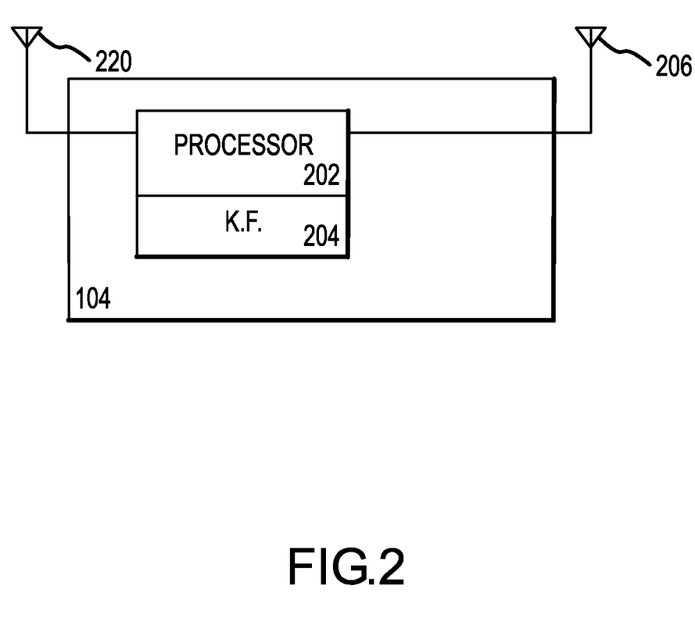
FIG. 2 illustrates portions of a mobile communications device in accordance with the principles of the present invention.

FIG. 2 depicts a block diagram of portions of a mobile communications device 104, in accordance with the principles of the invention, that relate to position determination for the mobile unit 104. The mobile unit 104 may include an antenna 220 configured to receive signals from a satellite navigation system or satellite positioning system and another antenna 206 configured to receive signals from a terrestrial communications network. These signals are provided to a processor 202 that includes both software and hardware components to provide signal processing functionality with respect to the signals. Of particular interest, a Kalman filter 204 is implemented as part of the mobile unit 104 to assist with the position determining functions of the mobile unit 104.

As is well known in the art, a positioning filter, such as a Kalman filter 204, receives input measurements and implements an algorithm for estimating desired variables based on the input measurements and the historical state of the system. A memory, although not shown, is often utilized to store state information, and covariance matrix values for the Kalman filter that provide a measure of error, or certainty, of the state estimates provided by the Kalman filter.

The mobile unit 104 may be, for example, a cellular telephone or similar mobile communications device. Accordingly, there are additional functional blocks and devices which are part of the mobile unit 104 that are not depicted in FIG. 2. These additional blocks and/or devices typically relate to processing signals received from the antennas 206, 220; providing a user interface, providing speech communications; providing data communications; and other similar capabilities Many of these functional blocks and devices are not directly related to position determination and, therefore, are not included so as not to obscure the principles of the present invention.

Figure 3:
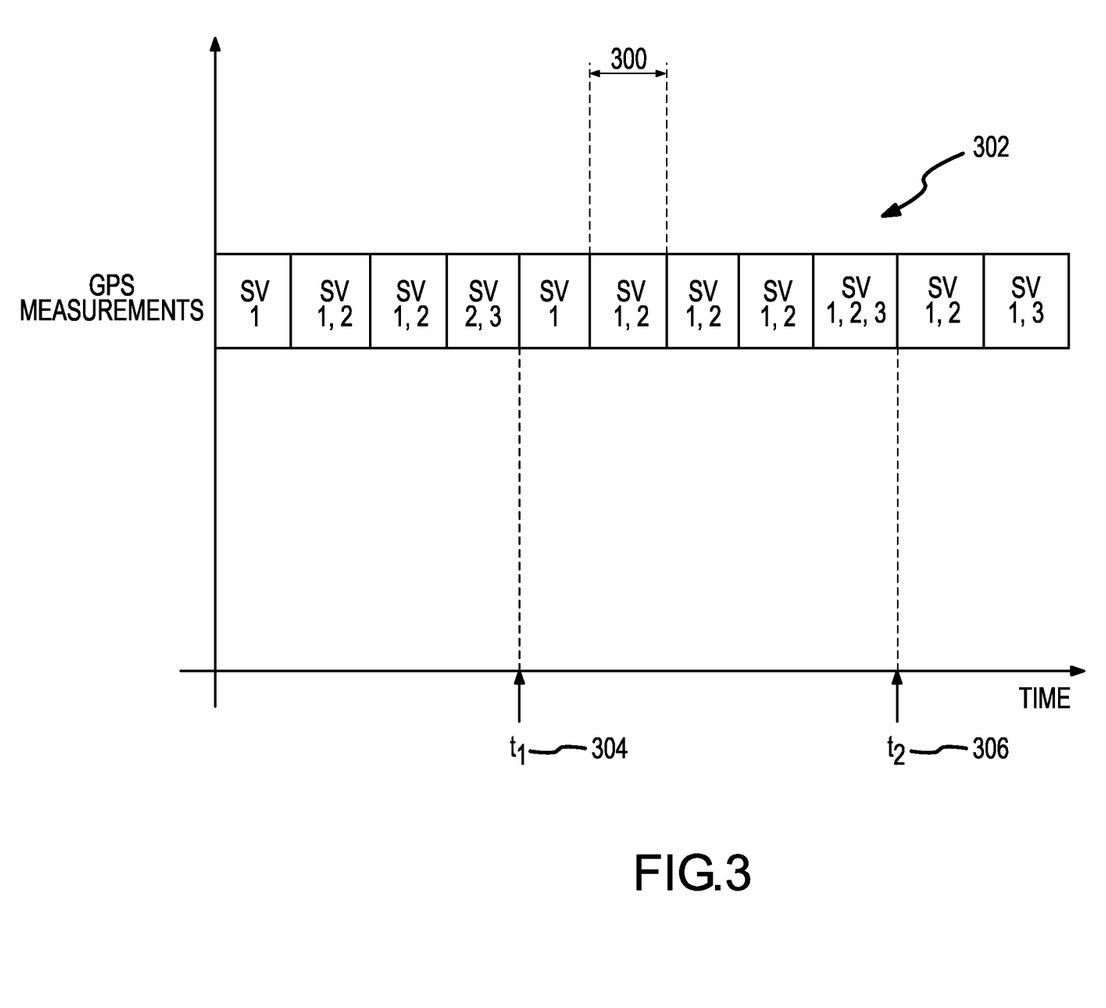
FIG. 3 depicts timeline of measurements received from various vehicles of a satellite position system.

As explained briefly earlier, signals are typically received from satellite vehicles by the antenna 220. These signals are then decoded and processed into position information using well known algorithms and techniques. In the past, signals from at least three satellite vehicles were required during a single measurement epoch in order to generate a position fix, using a weighted least squares (WLS) model, that could be used to initialize the Kalman filter 204. Once the Kalman filter is initialized, then it can continue producing position estimates based on later occurring GPS measurements. FIG. 3 depicts this scenario in which GPS measurements 302 (from 1, 2 or 3 satellites) are received during individual measurement epochs 300 and none of the earliest measurements include simultaneous signals from three different satellite vehicles. Thus, even though signals are constantly being acquired that include position information, the Kalman filter of the past has not been able to be initialized until GPS measurements are acquired from three different satellites during a single measurement epoch (which occurs at time 306).

In contrast, embodiments of the present invention use positioning information acquired during different measurement epochs to initialize a Kalman filter. Thus, three different measurements from multiple, non-simultaneous measurement epochs are available at time 304 (much earlier than time 306) and the Kalman filter is able to provide a good quality fix at this earlier point instead. The previous explanation relied on the assumption that only three satellite measurement signals are needed to generate a position fix of a receiver. This assumption rests on altitude information being available from alternative sources such as the communications network or the like. Alternatively, if no altitude information is available, then the same principle applies with four satellites, instead of three.

Even before three satellite positioning measurements are available, embodiments of the present invention can use two measurements to significantly improve upon an initial position. For example, using the measurements from two satellites can provide a horizontal position estimate that is typically at least 30% more accurate than the initial position, often within 100-500 meters.

Figure 4:
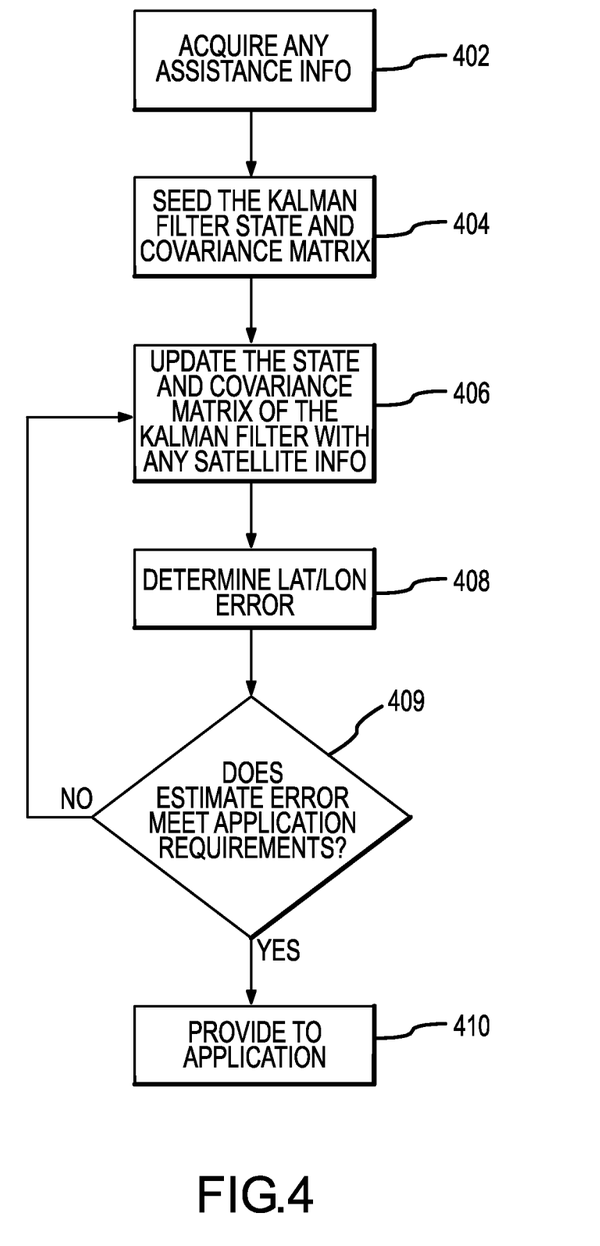
FIG. 4 depicts a flowchart of an exemplary method for determining a position of a mobile unit in accordance with the principles of the present invention.

FIG. 4 depicts a flowchart of an exemplary method of using different satellite measurements to provide position information according to the principles of the present invention. In step 402, the mobile unit starts by acquiring any position assistance information that is available from the communications network or from memory. For example, altitude within 50 meters may be available as could position within a few hundred meters if there is an assisted-GPS system present. Next, in step 404, this information is used to seed the Kalman filter state and covariance matrix. The Kalman filter is designed to provide a prediction of position and velocity as well as correct a previous prediction so as to provide a current position and velocity. Thus, the communications network, device memory, or other sources could provide the initial position and error estimates that seed the Kalman filter.

Next, in step 406, the Kalman filter state and covariance matrix are updated with any position information acquired from any satellite vehicle. For example, if the position of the mobile unit within a relatively small portion of the earth (e.g., a wireless network cell sector) is known, then the pseudoranging information from two satellites can be used to identify a relatively short straight line segment on which the mobile unit is located. As part of the inherent operation of the Kalman filter, the co-variance matrices are automatically updated to reflect a new error estimate for the predicted values. Thus, the Kalman filter provides an estimate, for example in step 408, of the latitude and the longitude of the mobile unit along with an estimate of the error or uncertainty. The altitude of the mobile unit is provided as well by the Kalman filter. Step 409 provides a test to determine if the estimated errors meet the application requirement. If yes, proceed to step 410 and provide the estimated latitude, longitude and altitude to the application. If no, return to step 406. One of ordinary skill will recognize that various mathematical manipulations and coordinate transformations may be performed to ensure that information loaded and updated in the state and co-variance matrices are in an appropriate format.

Figure 5:
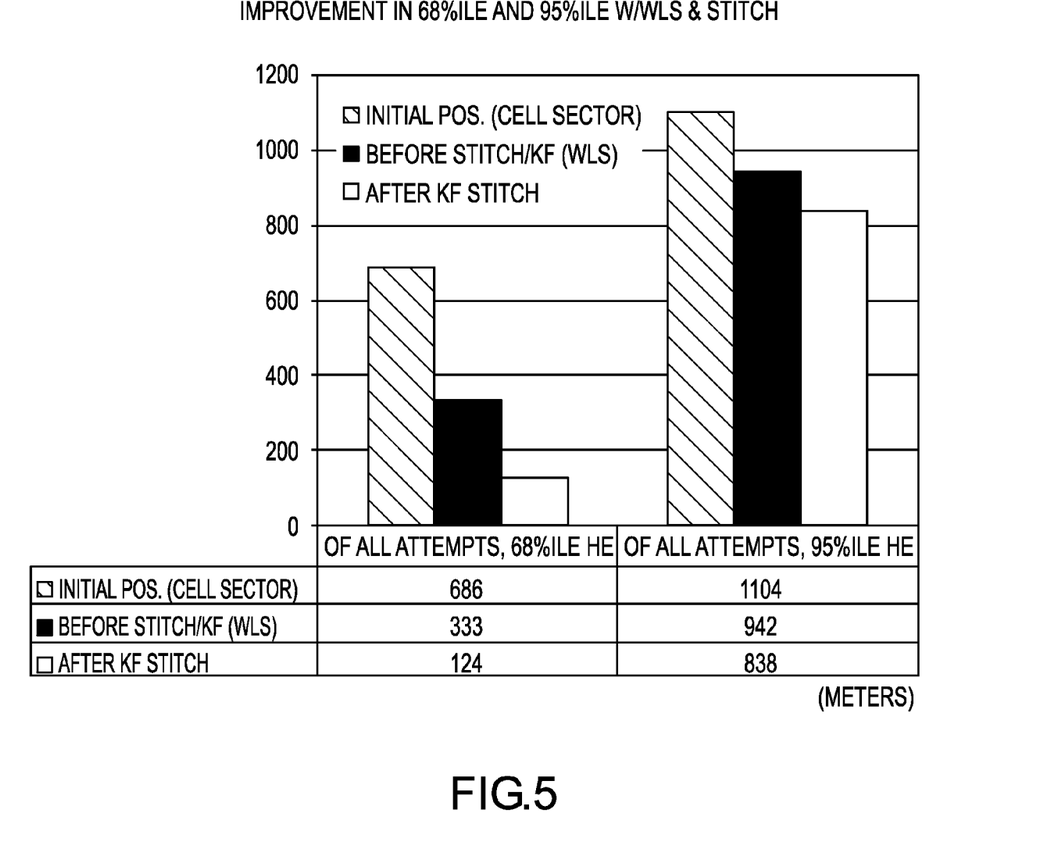
FIG. 5 summarizes the performance improvement using Monte Carlo simulation aggregated across multiple sites.

FIG. 5 summarizes the performance improvement using Monte Carlo simulation aggregated across multiple sites. The horizontal error (HE) for the 68th percentile improves from 333 m for WLS to 124 m for KF stitch. The HE for the 95th percentile improves from 942 m for WLS to 838 m for KF stitch.

Returning briefly to FIG. 3, the GPS measurements from subsequent epochs can be used to refine the estimate (via the Kalman filter) even when data from other satellites are unavailable. Thus, for example, two adjacent measurements from satellite vehicle "1"may be used by the Kalman filter even though no information from another satellite vehicle is available. Eventually, when information from additional satellites are acquired, the estimate from the Kalman filter can be updated accordingly even though such measurements are not received during the same measurement epoch. Ultimately, after enough updates, the Kalman filter will be able to predict position and velocity within an application-acceptable uncertainty level.

Figure 6:
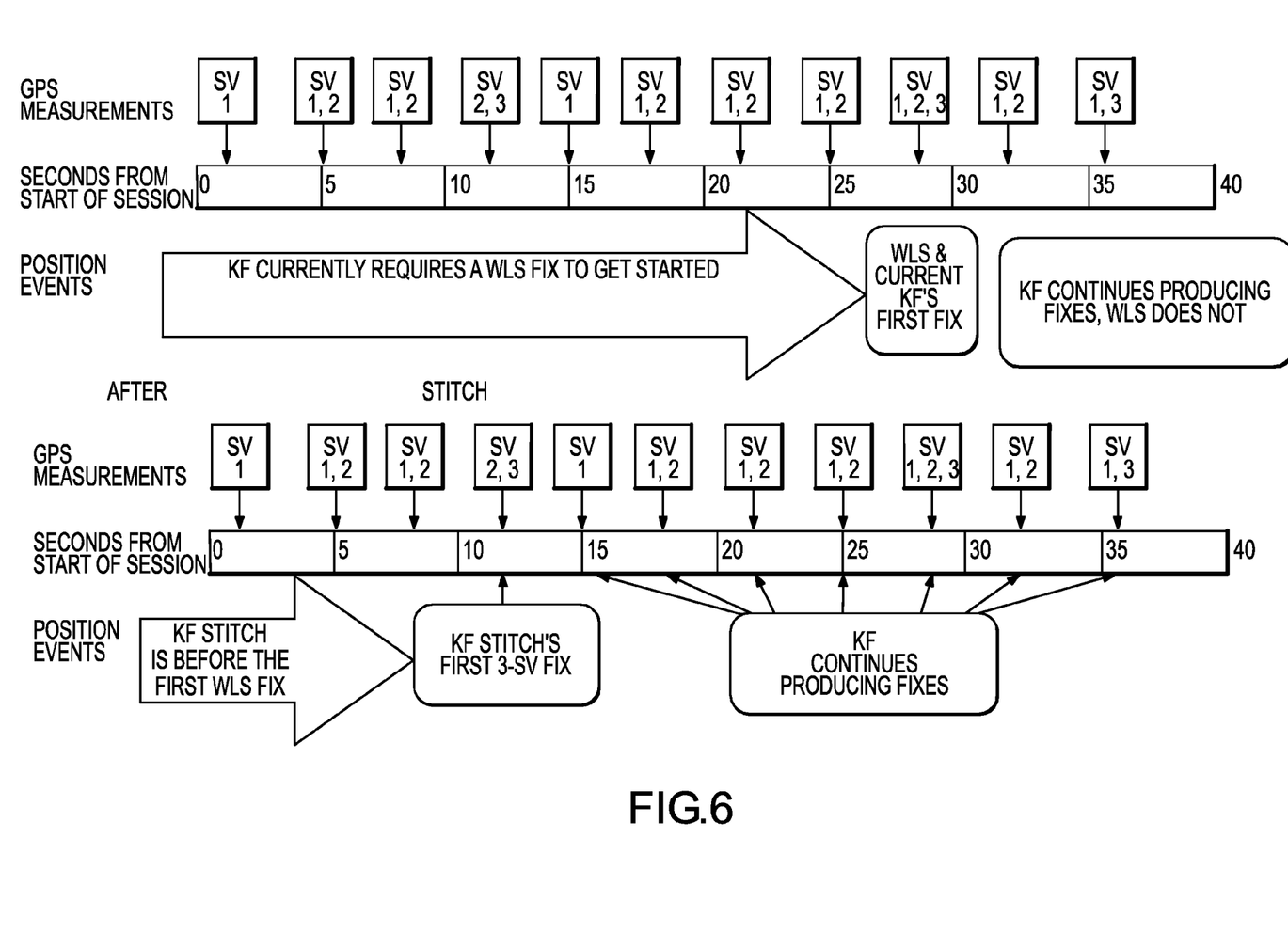
FIG. 6 shows further elaboration of the improved Kalman filter stitch method.

Further elaboration of the improved Kalman filter stitch method is shown in FIG. 6. The top diagram illustrates a conventional GPS measurement timeline scenario for a mobile receiver where the Kalman filter cannot be initialized until at least 3 simultaneous GPS measurements are available. A WLS position fix using 3 satellites is needed to start the KF estimation process which in this hypothetical example occurs nearly 30 seconds after the session start. Subsequently, the KF continues updating position fixes, even with less than 3 satellite measurements available in a given epoch. In contrast, the bottom diagram shows the invention GPS measurement timeline scenario where the Kalman filter can produce a typical-GPS-quality position solution with 3 non-simultaneous GPS measurements using the "stitching" capabilities of this invention. In this case, the KF estimation process starts about 10 seconds after the session start when at least 3 satellites have been successfully observed, albeit at different epochs. Moreover, after this successful initialization, the KF continues updating position fixes, even with less than 3 satellite measurements available in a given epoch.

Thus, the improved KF stitch method, illustrated above, provides the potential for greatly reducing the time to first fix for mobile GPS receivers in disadvantaged signal environments. Also, as discussed earlier, improved horizontal positioning accuracy may be attained as well.

Figure 7:
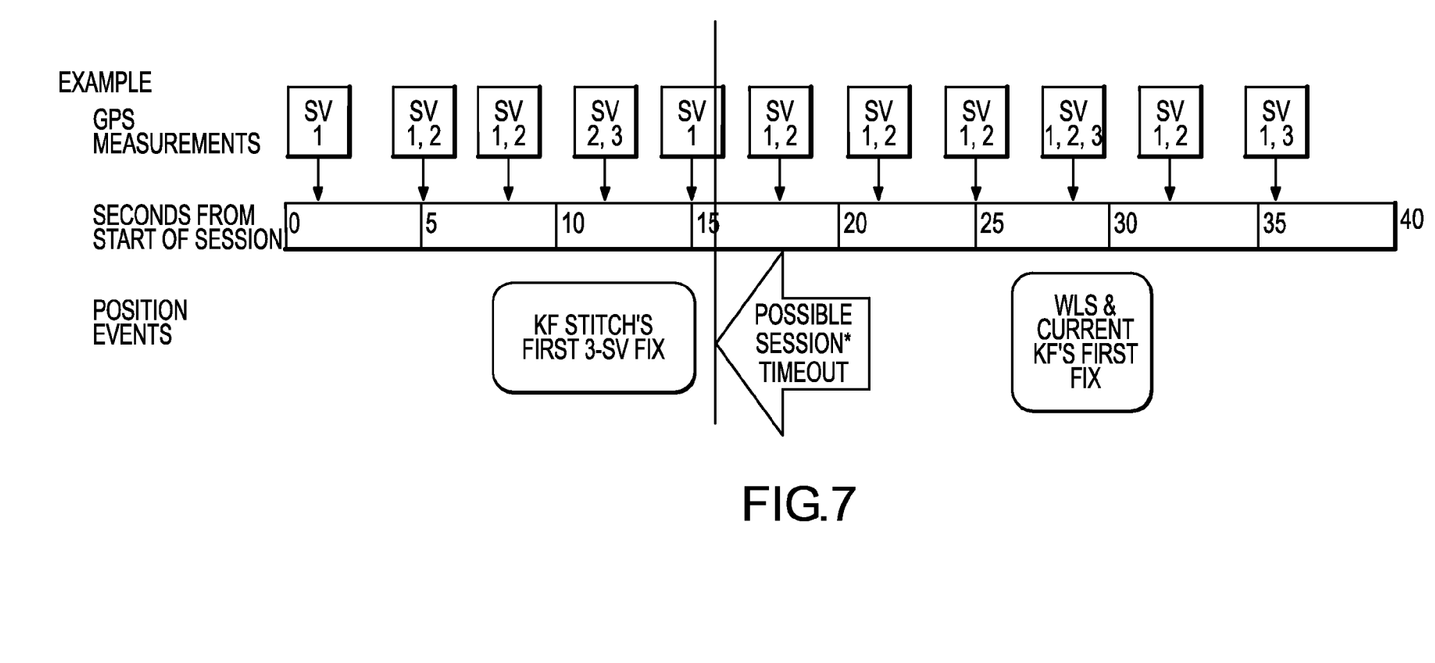
FIG. 7 shows a hypothetical example where the session has a timeout of 16 seconds.

Another advantage of this invention is improved solution yield in harsh signal environments. For example, FIG. 7 shows the same hypothetical example as in FIG. 6, then adding the hypothetical session timeout of 16 seconds. The conventional position fix based on a WLS estimate will not achieve a valid position before the timeout fix due to its delay of nearly 30 seconds. On the other hand, the initial position fix based on the KF stitch of this invention can achieve a valid fix in less than the timeout limit. Thus, this method can yield a greater probability of successful position fix for mobile GPS receivers in difficult signal environments.

Figure 8:
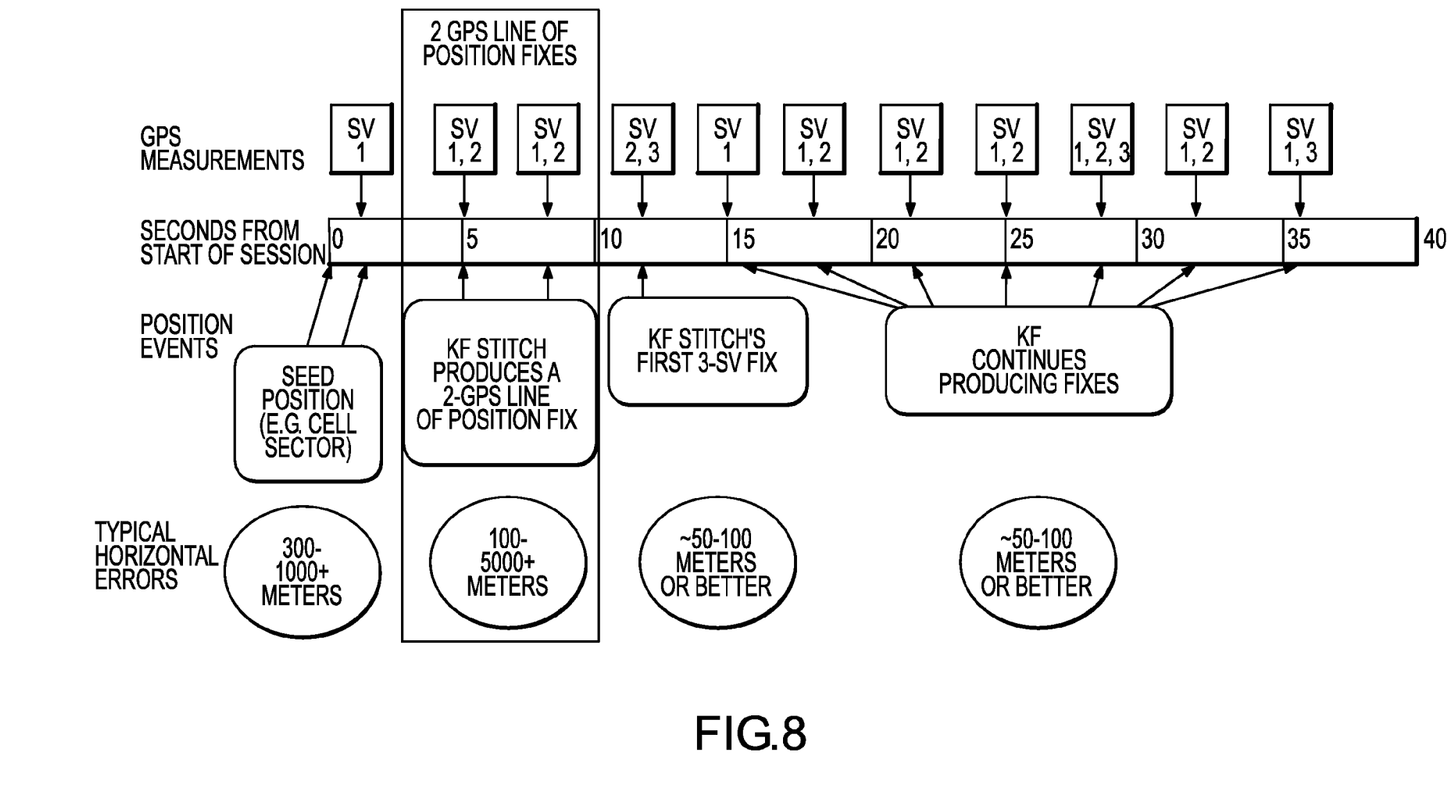
FIG. 8 illustrates a hypothetical situation where after only 2 satellites have been acquired, an improved seed position can be obtained prior to having 3 different satellite measurements.

Another aspect of this invention is the improvement in seed position uncertainty using 2-GPS line-of-position. FIG. 8 illustrates a hypothetical situation where after only 2 satellites have been acquired, an improved seed position can be obtained prior to having 3 different satellite measurements. This feature is based on the geometric property that in 3 dimensional positioning, having two valid pseudoranging measurements plus altitude results in a one-dimensional line of position solution. This solution has only one residual degree of freedom compared to the complete position fix, which results in a reduced linear uncertainty, and a substantially reduced area uncertainty, as compared to the seed position.

Figure 9:
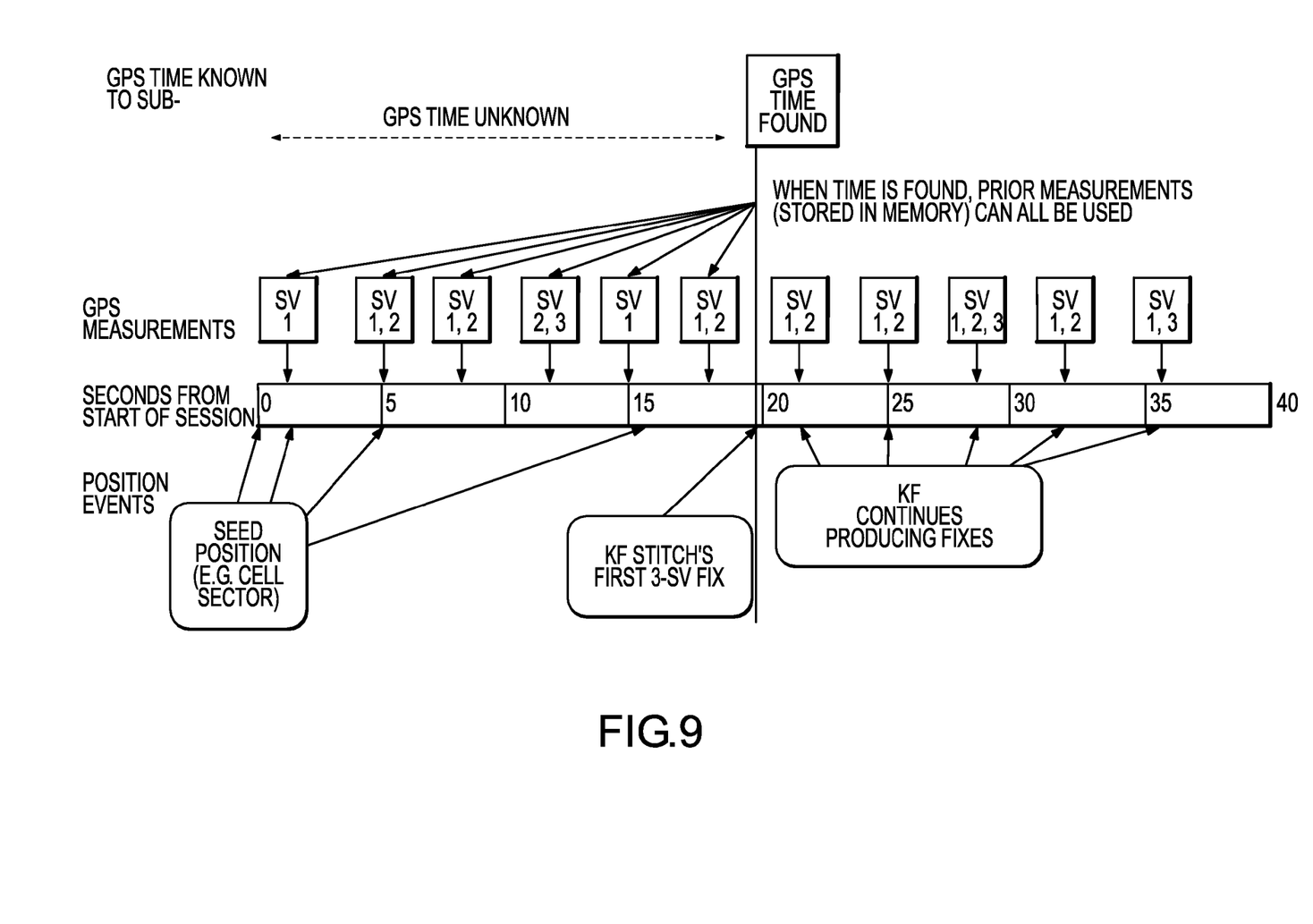
FIG. 9 shows a hypothetical case where GPS time is not acquired until about 20 seconds after session start.

Another example of the benefits of this invention is that if accurate GPS time is not available at session start, one can use back propagation to exploit prior, stored measurements after accurate (sub-millisecond) GPS time is acquired. For example, FIG. 9 shows a hypothetical case where GPS time is not acquired until about 20 seconds after session start. In other words, the first set of GPS ranging measurements may be acquired and saved, but not immediately used, due to the lack of GPS time information. Once GPS time is resolved, a relationship is established between local clock time and GPS time, and then previously saved GPS measurements may be associated with the correct GPS time and back propagation processing may be used to recover the previously stored data for improved position determination. Thus, back propagation allows the GPS receiver to exploit fully all valid GPS satellite measurements, even if GPS time is not acquired immediately, resulting in improved yield and accuracy.

Another example of the benefits of this invention is that if accurate satellite ephemeris data is not available at session start, one can use back propagation to exploit prior, stored measurements after accurate ephemeris is acquired. Once ephemeris data is obtained, the satellite position is known and then previously saved GPS measurements may be associated with the correct satellite ephemeris data and back propagation processing may be used to recover the previously stored data for improved position determination. Thus, back propagation allows the GPS receiver to exploit fully all valid GPS satellite measurements, even if satellite ephemeris data is not acquired immediately, resulting in improved yield and accuracy.

In practice, the position information of the Kalman filter is provided, in step 410, to one or more applications that may be executing on the mobile unit. For example, location based services such as localized weather may utilize position estimates with uncertainty approaching a kilometer or more. In contrast, "911"services may mandate that certainty of position estimates approach 50 meters or less. Accordingly, both the position (and velocity) estimates may be provided to applications along with any uncertainty, or error, estimates. In this way, each application may choose whether or not the position estimate from the Kalman filter is sufficient for its requirements.

The techniques described herein for broadcasting different types of transmission over the air may be implemented by various means. For example, these techniques may be implemented in hardware, software, or a combination thereof. For a hardware implementation, the processing units at a base station used to broadcast different types of transmission may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units at a wireless device used to receive different types of transmission may also be implemented within one or more ASICs, DSPs, and so on.

For a software implementation, the techniques described herein may be implemented with modules (e.g., procedures, functions, and so on) that perform the functions described herein. The software codes may be stored in a memory unit and executed by a processor. The memory unit may be implemented within the processor or external to the processor, in which case it can be communicatively coupled to the processor via various means as is known in the art.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the claim language wherein reference to an element in the singular is not intended to mean "one and only one"unless specifically so stated, but rather "one or more."All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for"or, in the case of a method claim, the element is recited using the phrase "step for."

What is claimed is:

1. A method for estimating a position fix using a Kalman filter implemented in a mobile communications device comprising a satellite position system (SPS) receiver and a processor, the method comprising:
   starting a measurement session that uses the SPS receiver and the processor;
   acquiring a first pseudoranging measurement set, during a first measurement epoch, corresponding to respective ranges from a first subset of reference stations to the mobile communications device, said first measurement epoch including a start of the measurement session, said first subset being less than three reference stations;
   initializing the Kalman filter, using at least the first pseudoranging measurement set, prior to acquiring simultaneous measurements at the mobile communications device of signals from at least three different reference stations during the same measurement epoch;
   acquiring a second pseudoranging measurement set, during a second measurement epoch, corresponding to respective ranges from a second subset of reference stations to the mobile communications device, during a second measurement epoch that is subsequent to said first measurement epoch, said second subset of reference stations including at least one reference station not included in said first subset of reference stations; and
   estimating a position fix of the mobile communications device, comprising updating the initialized Kalman filter using at least the second pseudoranging measurement set, prior to acquiring simultaneous pseudoranging measurements from at least three different reference stations during the same measurement epoch.

2. The method of claim 1, the first subset of reference stations and the second subset of reference stations not sharing a common satellite vehicle reference station.

3. The method of claim 1, the first subset of reference stations and the second subset of reference stations sharing at least one common satellite vehicle reference station.

4. The method of claim 1, further comprising:
   receiving at the mobile communications device position assistance information from a cellular communications network,
   said initializing the Kalman filter being configured to use at least a portion of the position assistance information in combination with the first pseudoranging measurement set, prior to acquiring simultaneous measurements at the mobile communications device of signals from at least three different reference stations during the same measurement epoch, and
   the estimating the position fix of the mobile communications device being configured to estimate the position as a three-dimensional position, updating the initialized Kalman filter.

5. The method of claim 4, the cellular communications network being configured to include a CDMA network.

6. The method of claim 4, the estimated initial three-dimensional position fix being configured to include a location value and an uncertainty value.

7. The method of claim 4, said initializing the Kalman filter comprising: seeding a portion of a state vector of the Kalman filter with at least a portion of the first pseudoranging measurement set and at least a portion of the received position assistance information.

8. The method of claim 4, said initializing the Kalman filter comprising:
   seeding a portion of a covariance matrix of the Kalman filter with at least a portion of the received position assistance information in combination with the first pseudoranging measurement set.

9. The method of claim 1, the first pseudoranging measurement set comprising a pseudoranging measurement that is related to a Global Positioning System.

10. The method of claim 1, further comprising:
    refining the estimated position fix of the mobile communications device, comprising subsequent updating the Kalman filter, with subsequent pseudoranging measurement sets acquired at the mobile communication device, corresponding to respective ranges from any of a plurality of reference stations during one or more measurement epochs subsequent to the second measurement epoch.

11. A method for estimating a position fix of a mobile communications device including a wireless receiver and a processor, the method comprising:
    starting a measurement session that uses the wireless receiver and the processor;
    acquiring a first pseudoranging measurement set during a first measurement epoch, corresponding to ranges from a first subset of pseudoranging sources to the mobile communications device, said first measurement epoch including a start of the measurement session, said first subset being less than three pseudoranging sources;

initializing the Kalman filter implemented in the mobile communications device, using at least the first pseudoranging measurement set, prior to acquiring simultaneous measurements at the mobile communications device of signals from at least three different pseudoranging sources during the same measurement epoch;

acquiring a second pseudoranging measurement set during a second measurement epoch, corresponding to respective ranges from a second subset of pseudoranging sources to the mobile communications device, during a second measurement epoch that is subsequent to said first measurement epoch, and said second subset of pseudoranging sources comprising at least one pseudoranging source that is not in said first subset of pseudoranging sources; and estimating a position fix of the mobile communications device, comprising updating the initialized Kalman filter using at least the second pseudoranging measurement set, prior to acquiring simultaneous pseudoranging measurements from at least three different pseudoranging sources during the same measurement epoch.

12. The method of claim 11, the pseudoranging sources comprising terrestrial wireless network base stations.

13. The method of claim 11, the pseudoranging sources comprising a combination of terrestrial wireless network base stations and reference stations.

14. The method of claim 11, the pseudoranging sources comprising satellites of a satellite positioning system.

15. A mobile communications device comprising:
a Kalman filter;
a first receiver, configured to receive signals related to a satellite positioning system;
a second receiver, configured to receive signals related to a communications network; and
a processor, adapted to communicate with the first and second receiver, the processor being further adapted to:
start a measurement session;
acquire, using the first receiver, a first pseudoranging measurement set during a first measurement epoch, corresponding to respective ranges from a first subset of reference stations, of the satellite positioning system, to the mobile communications device, said first measurement epoch including a start of the measurement session;
initialize the Kalman, using at least the first pseudoranging measurement set, prior to acquiring simultaneous measurements of signals from at least three different reference stations during the same measurement epoch;
acquire, using the first receiver, a second pseudoranging measurement set during a second measurement epoch, corresponding to respective ranges from a second subset of reference stations, of the satellite positioning system, to the mobile communications device, said second measurement epoch being subsequent to said first measurement epoch, and said second subset of reference stations comprising at least one reference station that is not in said first subset of reference stations; and
to estimate a position fix of the mobile communications device, comprising updating the initialized Kalman filter using at least the second pseudoranging measurement set, prior to acquiring simultaneous pseudoranging measurements from at least three different reference stations of the satellite positioning system during the same measurement epoch.

16. The device of claim 15, the first subset of reference stations and the second subset of reference stations not sharing a common satellite vehicle reference station.

17. The device of claim 15, the first subset of reference stations and the second subset of reference stations sharing at least one common satellite vehicle reference station.

18. The device of claim 15, the second receiver being further adapted to receive position assistance information from the communications network,
said processor being further adapted to initialize the Kalman filter, using at least a portion of the position assistance information in combination with the first pseudoranging measurement set, prior to acquiring simultaneous measurements at the mobile communications device of signals from at least three different reference stations during the same measurement epoch, and
the processor being further adapted to estimate the position fix as a three-dimensional position fix of the mobile communications device, updating the initialized Kalman filter.

19. The device of claim 18, the communications network being configured to include a CDMA network.

20. The device of claim 18, the estimated initial position fix being configured to include a location value and an uncertainty value.

21. The device of claim 18, the processor being further adapted to include, in operations to initialize the Kalman filter, operations to:
seed a portion of a state vector of the Kalman filter and a portion of a covariance matrix of the Kalman filter with at least a portion of the received position assistance information.

22. The device of claim 15, the first pseudoranging measurement being configured in a relation to a Global Positioning System.

23. The device of claim 15, the processor being further adapted to:
refine the estimated position fix of the mobile communications device, including to update the initialized with subsequent pseudoranging measurements acquired from any of a plurality of reference stations of the satellite positioning system during one or more measurement epochs subsequent to the second measurement epoch.

24. A method for estimating a position fix, using a Kalman filter implemented in a mobile communications device comprising a satellite positioning system (SPS) receiver and a processor, the method comprising:
starting a measurement session, using the SPS receiver and the processor;
acquiring a first pseudoranging measurement set, during a first measurement epoch, corresponding to respective ranges from a first subset of reference stations, said first measurement epoch including a start of the measurement session;
initializing the Kalman filter, using at least the first pseudoranging measurement set, prior to acquiring simultaneous measurements at the mobile communications device of signals from at least three different reference stations during the same measurement epoch;
acquiring a second pseudoranging measurement set, corresponding to respective ranges from a second subset of reference stations to the mobile communications device, during a second measurement epoch that is subsequent to said first measurement epoch, said second subset of reference stations comprising at least one reference station that is not in said first subset of reference stations;

using back propagation to determine time for the first subset of reference stations and the second subset of reference stations, based on SPS time acquired after acquiring the first pseudoranging measurement set and acquiring the second pseudoranging measurement set; and estimating a position fix of the mobile communications device, using determined time for the first subset of reference stations and the second subset of reference stations and comprising updating the initialized Kalman filter using at least the second pseudoranging measurement set, prior to acquiring simultaneous pseudoranging measurements from at least three different reference stations during the same measurement epoch.

25. A non-transitory computer readable medium embodying a program of instructions executable by one or more processors of a mobile communications device also comprising a Satellite Positioning System (SPS) receiver, to adapt said one or more processors to:

start a measurement session that uses the SPS receiver and the processor;

acquire, using the SPS receiver, a first pseudoranging measurement set during a first measurement epoch, corresponding to respective ranges from a first subset of reference stations to the mobile communications device, said first measurement epoch including a start of the measurement session;

initialize the Kalman filter, using at least the first pseudoranging measurement set, prior to acquiring simultaneous measurements at the mobile communications device of signals from at least three different reference stations during the same measurement epoch;

acquire a second pseudoranging measurement set, corresponding to respective ranges from a second subset of reference stations to the mobile communications device, during a second measurement epoch that is subsequent to said first measurement epoch, said second subset of reference stations comprising at least one reference station that is not in said first subset of reference stations; and estimating a position fix of the mobile communications device, comprising updating the initialized Kalman filter, using at least the second pseudoranging measurement set, prior to acquiring simultaneous pseudoranging measurements from at least three different reference stations during the same measurement epoch.

26. The non-transitory computer readable medium of claim 25, further comprising program instructions executable by said one or more processors to use back propagation to determine time for the first subset of reference stations and the second subset of reference stations based on Satellite Positioning System (SPS) time acquired after the first pseudoranging measurement set and the second pseudoranging measurement set.

27. A mobile communications device comprising:

a first receiver means for receiving signals related to a satellite positioning system;

a second receiver means for receiving signals related to a communications network; and a processor means adapted to communicate with the first receiver means and the second receiver means, the processor means comprising a Kalman filter, and adapted to:

start a measurement session, using at least the first receiver means;

acquire, using at least the first receiver means, a first pseudoranging measurement set during a first measurement epoch, corresponding to respective ranges from a first subset of reference stations to the mobile communications device, said first measurement epoch including a start of the measurement session;

initialize the Kalman filter, using at least the first pseudoranging measurement set, prior to acquiring simultaneous measurements at the mobile communications device of signals from at least three different reference stations during the same measurement epoch;

acquire, using at least the first receiver means, a second pseudoranging measurement set during a second measurement epoch, corresponding to respective ranges from a second subset of reference stations of the satellite positioning system to the mobile communications device, said second measurement epoch being subsequent to said first measurement epoch, and said second subset of reference stations comprising at least one reference station that is not included in said first subset of reference stations; and estimate a position fix of the mobile communications device, comprising updating the initialized Kalman filter, using at least the second pseudoranging measurement set, prior to acquiring simultaneous pseudoranging measurements from at least three different reference stations during the same measurement epoch.

28. The method of claim 1, said first subset of reference stations and said second subset of reference stations being satellite vehicles.

29. The method of claim 1, further comprising:

determining whether an uncertainty value associated with position fix meets an uncertainty requirement associated with an application executing on the mobile communications device; and providing the position fix and the uncertainty value associated therewith to the application executing on the mobile communications device in response to the uncertainty value associated with the position fix meeting the uncertainty requirement associated with the application.

30. The method of claim 10, further comprising:

determining that a first uncertainty value associated with the position fix does not meet an uncertainty requirement associated with an application executing on the mobile communications device;

determining that a second uncertainty value associated with the refined position fix meets the uncertainty requirement associated with the application executing on the mobile communications device; and providing the refined position fix and the second uncertainty value to the application executing on the mobile communications device.

* * * * *